United States Patent [19]

Blackburn et al.

[11] Patent Number: 5,571,253
[45] Date of Patent: Nov. 5, 1996

[54] SEAT BELT RETRACTOR SYSTEM

[75] Inventors: Brian K. Blackburn, Rochester; Louis R. Brown, Oxford; Joseph F. Mazur, Washington; Scott B. Gentry, Romeo, all of Mich.

[73] Assignee: TRW Vehicle Safety Systems Inc., Lyndhurst, Ohio

[21] Appl. No.: 468,265

[22] Filed: Jun. 6, 1995

Related U.S. Application Data

[62] Division of Ser. No. 222,120, Apr. 4, 1994.

[51] Int. Cl.$^6$ ................................................. B60R 21/00
[52] U.S. Cl. ........................ 180/282; 280/806; 297/480; 242/382
[58] Field of Search ............................... 280/806, 807, 280/801.1, 735, 730.1; 180/274, 282; 307/9.1, 10.1; 340/539, 436, 667; 297/468, 474, 477, 483, 480; 242/382

[56] References Cited

U.S. PATENT DOCUMENTS

| | | |
|---|---|---|
| 3,760,351 | 9/1973 | Thomas . |
| 3,871,472 | 3/1975 | Hosaka et al. . |
| 4,103,754 | 8/1978 | Ashworth et al. . |
| 4,660,528 | 4/1987 | Buck . |
| 4,700,974 | 10/1987 | Andres et al. . |
| 4,895,317 | 1/1990 | Rumpf et al. . |
| 4,977,623 | 12/1990 | DeMarco . |
| 5,015,010 | 5/1991 | Homeier et al. . |
| 5,069,478 | 12/1991 | Kim . |
| 5,316,124 | 5/1994 | Barnes et al. . |
| 5,362,098 | 11/1994 | Guill . |
| 5,430,334 | 7/1995 | Meister ................................. 180/282 |

FOREIGN PATENT DOCUMENTS

| | | |
|---|---|---|
| 0589466 | 3/1994 | European Pat. Off. . |
| 2197320 | 3/1994 | France . |
| 1524022 | 9/1978 | Germany . |
| 4233155 | 4/1994 | Germany . |
| 8501217 | 3/1995 | WIPO . |

OTHER PUBLICATIONS

German Patent Appln. No. DE 4029–916A (abstract only) Sep. 1990.
An abstract of Japanese Patent No. 570 87 738 dated Jun. 1, 1992.
A copy of an EPO Search Report dated Aug. 1, 1995.

*Primary Examiner*—Paul N. Dickson
*Attorney, Agent, or Firm*—Tarolli, Sundheim, Covell, Tummino & Szabo

[57] ABSTRACT

A vehicle seat belt retractor system (10) includes two seats (16, 18) each having its own integrated seat belt webbing retractor (60, 112). Each retractor (60, 112) includes locking assembly (76, 80) for blocking belt withdrawal in response to an electrical signal. At a central location in the vehicle spaced from the seats (16, 18), a sensor (24) is disposed for sensing vehicle deceleration exceeding a predetermined deceleration and for providing a control signal indicative thereof. An RF transmitter (42) is electrically connected with the sensor (24) and is actuatable in response to the control signal to transmit an RF signal. An RF receiver (100, 114) on each vehicle seat (16, 18) receives the RF signal and provides an output signal to actuate the locking assembly (76, 80) of the two seat belt retractors (60, 112). Each vehicle seat (16, 18) also has (a) a battery (98) for supplying electric power to actuate the locking assembly (76, 80) of the retractors (60, 112) and (b) a piezoelectric member (90) responsive to an occupant sitting on the seat for generating an electric current to charge the battery (96). In a second embodiment, a separate deceleration sensor (24a) is mounted on each vehicle seat for electrically actuating its associated retractor. In a third embodiment, the transmitted signal provides the power for actuating a vehicle occupant restraint (178).

7 Claims, 4 Drawing Sheets

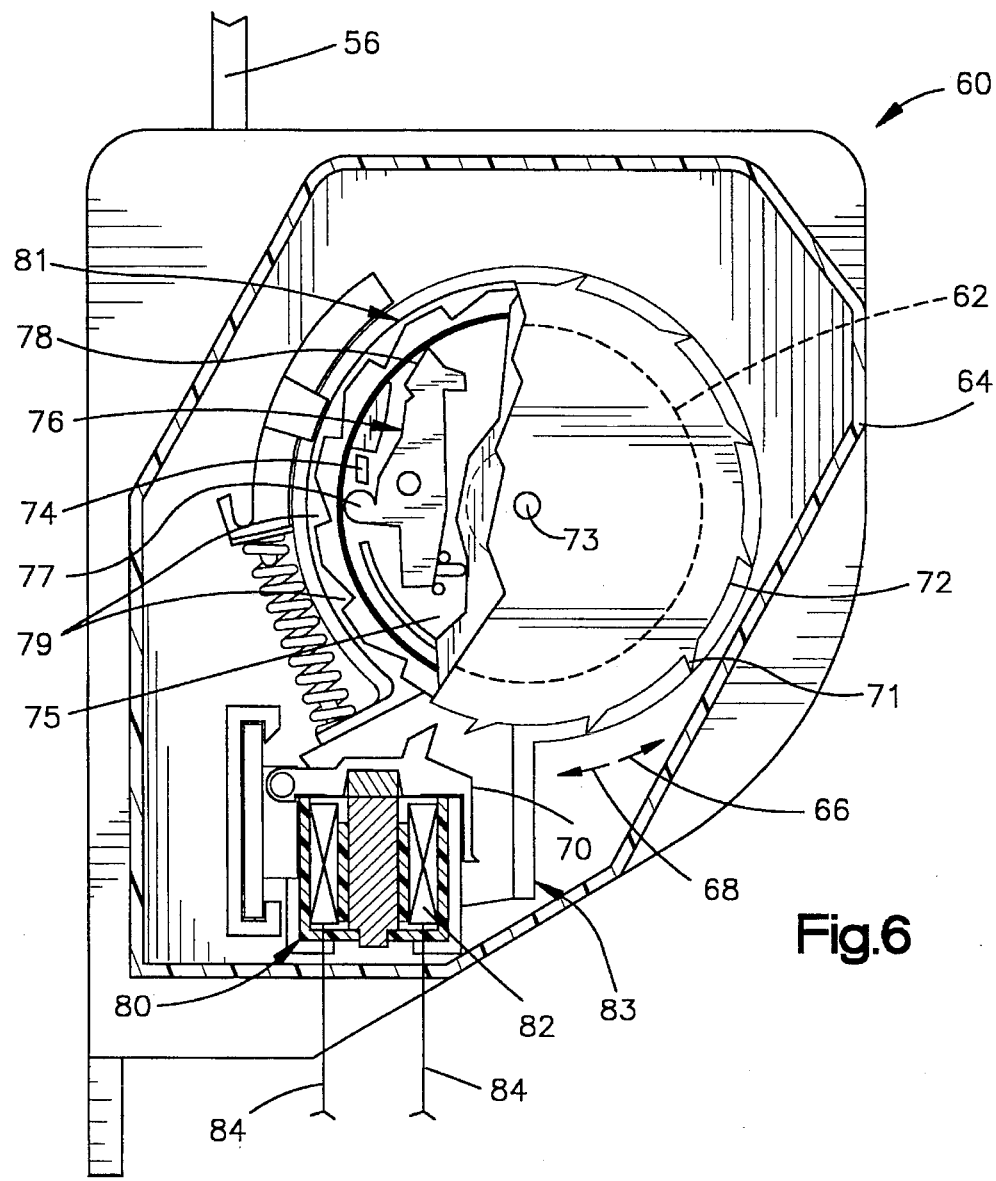

SEAT BELT RETRACTOR SYSTEM

This is a divisional of copending application Ser. No. 08/222,120 filed on Apr. 4, 1994 pending.

BACKGROUND OF THE INVENTION

1. Technical Field

The present invention relates to a vehicle seat belt retractor system which includes one or more electrically lockable seat belt retractors integrated into one or more vehicle seats.

2. Description of the Prior Art

It is known to provide a vehicle seat belt system integrated into a vehicle seat. In such integrated systems, a seat belt retractor may be located in the upper corner of the seat back. Seat belt webbing is wound on a spool in the retractor and extends from the retractor. In the event of vehicle deceleration exceeding a predetermined deceleration, a locking mechanism in the retractor blocks rotation of the retractor spool in the belt withdrawal direction to restrain movement of the vehicle occupant.

SUMMARY OF THE INVENTION

The present invention relates to a vehicle occupant restraint system integrated into one or more vehicle seats. In a first embodiment of the invention, a vehicle safety apparatus includes a seat having an integrated seat belt webbing retractor. The retractor includes locking means for blocking belt withdrawal in response to an electrical signal.

At a location in the vehicle, spaced from the seat, a sensor is disposed for sensing vehicle deceleration exceeding a predetermined deceleration and for providing a control signal indicative of such deceleration. A radio frequency (RF) transmitter powered by the vehicle's electrical system is electrically connected with the sensor and is actuatable in response to the control signal to transmit an RF signal. An RF receiver on the vehicle seat receives the RF signal and provides an electrical signal to actuate the locking means of the seat belt retractor to lock the retractor.

The vehicle seat includes an electrical energy storage device such as a battery for supplying electric power to actuate the locking means of the retractor. On the seat is an electrical energy generating device such as a piezoelectric member responsive to an occupant sitting on the seat for generating an electric current. The piezoelectric member charges the battery with the electric current generated by the piezoelectric member. Thus, the portions of the seat belt system integrated into the seat do not require connection to the vehicle's electrical system.

A second vehicle seat may be provided with its own integrated seat belt retractor with locking means. A second RF receiver on the second vehicle seat simultaneously receives the RF signal and actuates the locking means of the second retractor to lock the second retractor. A battery on the second seat supplies electric power to actuate the locking means of the second retractor. A piezoelectric member on the second seat is responsive to an occupant sitting on the second seat for generating an electric current to charge the second battery.

A second embodiment of the invention does not include the RF transmitter or receiver or the deceleration sensor spaced from the vehicle seat. Instead, a separate deceleration sensor is mounted on each vehicle seat for electrically actuating its associated retractor. Thus, no part of the seat belt system is powered by the vehicle's electrical system.

In a third embodiment of the invention, the energy contained in a transmitted radio signal is used to power a vehicle occupant protection device. No other power source such as a battery or a vehicle electrical system is needed. Accordingly, a vehicle occupant protection device can be integrated in a removable vehicle seat without the need to provide a battery in the seat or to provide electrical power connections between the removable seat and the vehicle electrical system.

The retractors described herein can also include a redundant webbing sensitive device that will function to block rotation of the spool in either a series or a parallel mechanism arrangement.

BRIEF DESCRIPTION OF THE DRAWING

The foregoing and other features of the present invention will become apparent to one skilled in the art to which the present invention relates upon consideration of the following description of the invention with reference to the accompanying drawings, wherein:

FIG. 6 is a view, partially in section, of a seat belt retractor including an electrically actuatable locking mechanism as used in the seat of FIG. 4;

FIG. 7 is a block diagram similar to FIG. 5 of a control module in accordance with a second embodiment of the invention;

DESCRIPTION OF PREFERRED EMBODIMENT OF THE INVENTION

Figure 1:
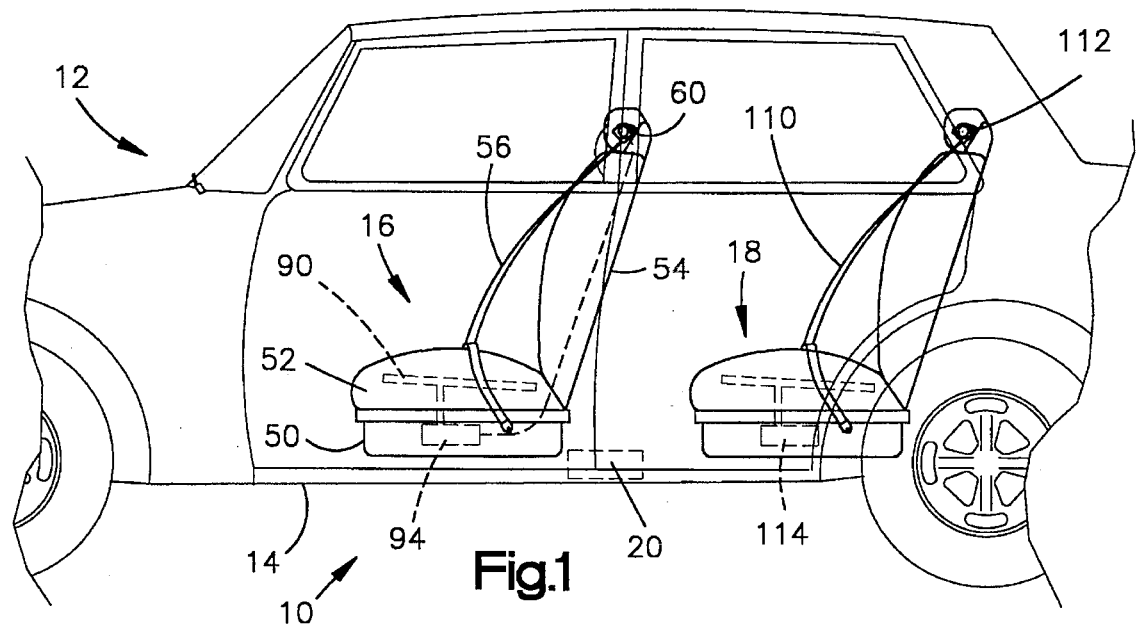
FIG. 1 is a fragmentary schematic view of a vehicle including a seat belt retractor system constructed in accordance with the present invention.

The present invention relates to a vehicle seat belt system and particularly to a seat belt system integrated into one or more vehicle seats. The present invention is applicable to various seat belt systems. As representative of the present invention, FIG. 1 illustrates schematically a seat belt system 10.

The seat belt system 10 is incorporated in a vehicle 12. The vehicle 12 includes a load bearing body or frame structure 14. First and second vehicle occupant seats 16 and 18 are supported on the vehicle structure 14.

A central crash sensor and transmitter module 20 is rigidly mounted to the vehicle structure 14. The central module 20 is mounted to the structure 14 at a location spaced apart from the seats 16 and 18, preferably at or near the center of gravity of the vehicle. The central module 20, as illustrated schematically in FIGS. 2 and 3, includes a support member 22 which is electrically non-conductive.

A deceleration sensor switch 24 is connected with the support member 22.

The deceleration sensor switch 24 includes a hollow conical member 26 made of an electrically conductive material, preferably metal. The conical member 26 is suspended from the support member 22. An inertia mass 28, which is preferably a metal ball, is supported for rolling movement on the inside of the conical member 26. An electrically conductive pad 30 is disposed within the conical member 26, on the underside of the support member 22. The conductive pad 30 is spaced apart from the conductive conical member 26.

The conductive pad 30 is connected by electrical wiring 36 to the vehicle battery 38 which is part of the electrical system of the vehicle 12. The conical member 26 is connected by electrical wiring 40 to an RF transmitter 42 mounted on the support member 22.

Figure 4:
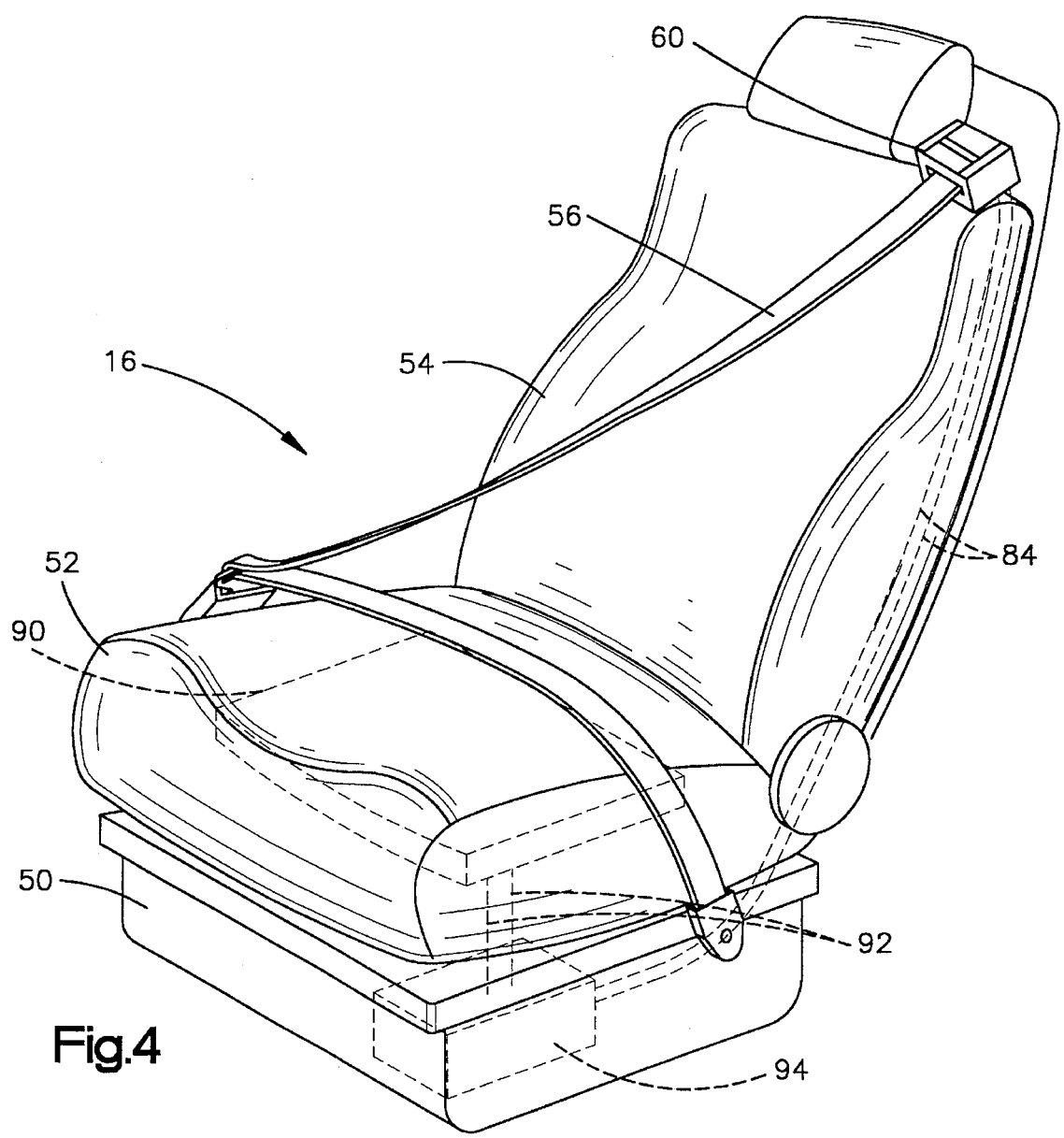
FIG. 4 is a pictorial view of a vehicle seat including portions of the seat belt retractor system of FIG. 1.

The first vehicle seat 16 (FIG. 4) includes a frame 50, a seat bottom cushion 52, and a seat back 54. A length of seat belt webbing 56, connected with the seat 16, is extensible around an occupant of the seat to restrain movement of the occupant.

The seat belt webbing 56 extends through a retractor 60 (FIG. 6) which is similar to the retractor shown in U.S. Pat. No. 4,895,317. In the retractor 60, the belt webbing 56 is wound around a retractor spool 62 rotatable in a housing 64 in a belt retraction direction 66 and an opposite belt withdrawal direction 68.

The retractor 60 includes an actuator lever 70 movable into engagement with one of a plurality of ratchet teeth 71 on the outer periphery of a clutch disk 72. The clutch disk 72 is part of an intermediate linkage for blocking rotation of the spool 62 in the belt withdrawal direction 68 upon movement of the actuator lever 70 into a position in engagement with the clutch disk. The clutch disk 72 is supported for rotation about the axis 73 of the retractor 60. A pin 74 projects axially from the clutch disk 72.

The retractor 60 also includes a drum 75 connected for rotation with the spool 62. A pilot pawl 76 is rotatable with the drum 75 and is supported for pivotal movement on the drum. The pilot pawl 76 has first and second end portions 77 and 78.

The second end portion 78 of the pilot pawl 76 is engageable with one of a plurality of ratchet teeth 79 formed on the inner periphery of a ring 81 which is supported for rotation about the axis 73. The ring 81 is formed as a part of, or otherwise connected for rotation with, an actuator member 83 engageable with a lock pawl (not shown). The lock pawl is engageable with a ratchet wheel (also not shown) connected for rotation with the retractor spool 62.

The retractor 60 includes an electromagnet assembly 80 which includes a coil 82. The coil 82 is energizeable, by electric current flowing through wiring 84, to move the actuator lever 70 into engagement with the clutch disk 72.

The first vehicle seat 16 (FIG. 1) also includes a battery charger unit 90 disposed in the seat bottom cushion 52. The battery charger unit 90 includes a known flexible piezoelectric film which, when deformed, generates an electric current.

Figure 5:
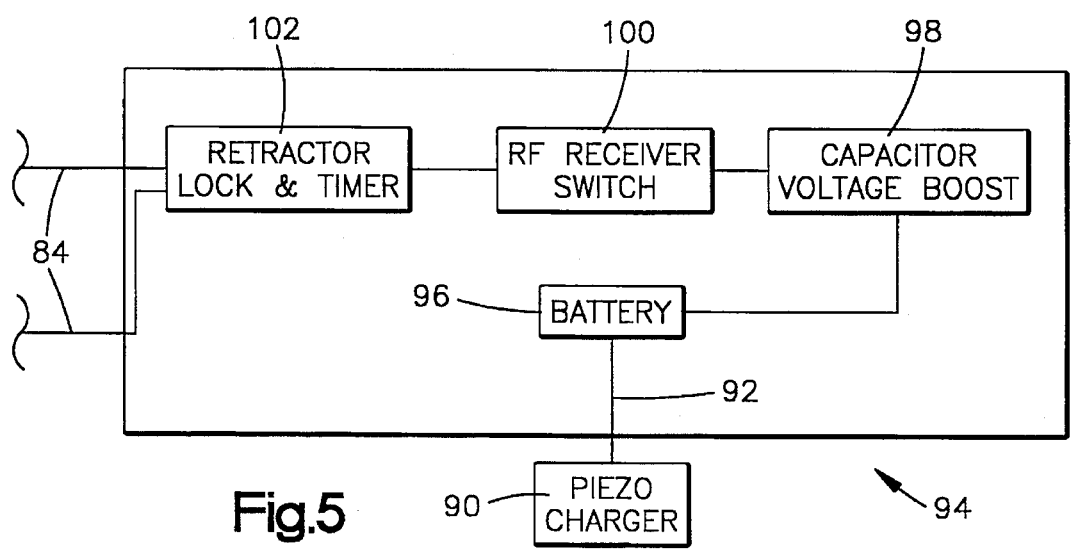
FIG. 5 is a block diagram of a control module located in the seat of FIG. 4.

The piezoelectric charger unit 90 is connected by wiring 92 to a control module 94 (FIG. 5) fixed to the seat frame 50. The control module 94 includes a battery 96. The battery 96 is preferably a known battery which has a six-volt output and a ten year life. A battery with a different voltage, such as three volts, may also be used.

Figure 2:
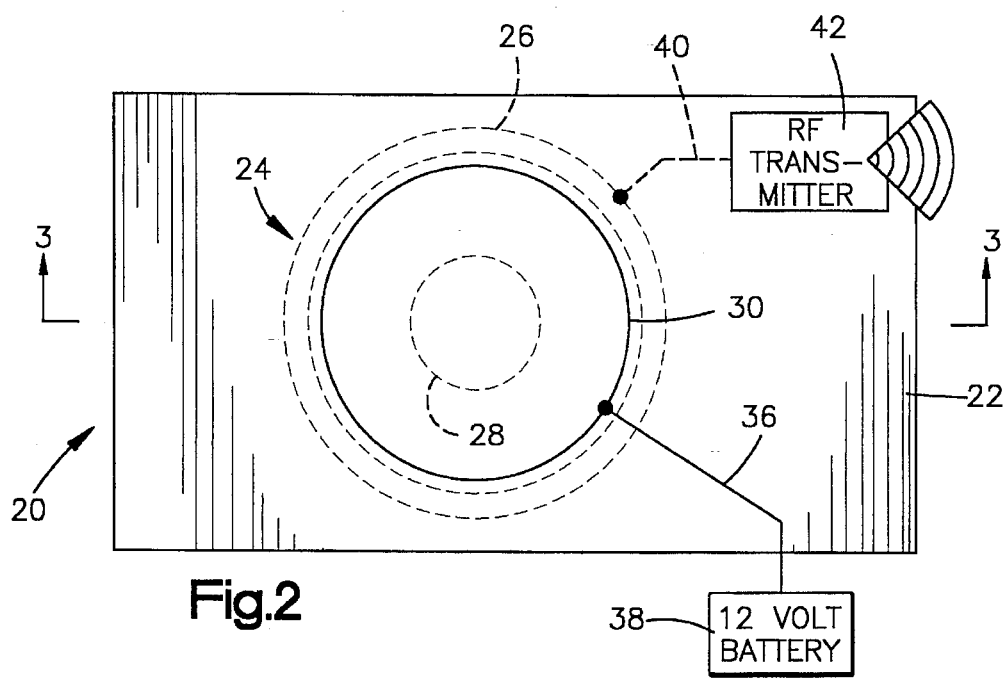
FIG. 2 illustrates schematically a central crash sensor module of the retractor system of FIG. 1.

The output of the battery 96 (FIG. 5) is connected to a capacitor and voltage booster assembly 98. The output of the assembly 98 is connected to an RF receiver switch 100. The RF receiver switch 100 includes an RF receiver for receiving a signal from the RF transmitter 42 (FIG. 2). The RF receiver switch 100 also includes a switch for connecting the assembly 98 to retractor lock and timer circuitry indicated schematically at 102.

The second vehicle seat 18 (FIG. 1) is similar to the first seat 16. The second seat 18 includes a length of seat belt webbing 110 associated with a seat belt webbing retractor 112. The retractor 112 is similar to the retractor 60, and includes a similar electrically actuatable locking assembly for blocking withdrawal of the belt webbing 110 from the retractor 112. The locking assembly of the retractor 112 is actuatable by a control signal generated by a control module 114 similar to the control module 94 of the first seat 16. The control module 114 is located in the second seat 18.

During normal operation of the vehicle 12, whenever a vehicle occupant sits on the seat bottom cushion 52 (FIG. 4), the weight of the vehicle occupant deforms the piezoelectric film in the battery charger unit 90. When the piezoelectric film deforms, it generates an electric current which passes through the wires 92 to the battery 96. The electric current maintains the battery 96 in a charged condition having sufficient power to supply the remaining components of the control module 94 as well as the electromagnet assembly 80.

In the event of vehicle deceleration exceeding a predetermined deceleration, such as occurs in a collision, the metal ball 28 of the deceleration sensor switch 24 moves along the inclined surface of the conical member 26 into engagement with the conductive pad 30. The engagement of the metal ball 28 with the conductive pad 30 completes an electric circuit between the conical member 26 and the conductive pad 30. Completion of this circuit enables current to flow from the vehicle battery 38 through the deceleration sensor switch 24 and to the RF transmitter 42.

The RF transmitter 42 when thus energized transmits an RF signal within the vehicle 12. The RF signal is received by the RF receiver switch 100 of the first seat control module 94. Reception of the RF signal results in closing of the switch within the RF receiver switch 100, to electrically connect the output of the assembly 98 to the retractor lock and timer circuitry 102.

The retractor lock and timer circuitry 102 applies an electric current over the wiring 84 to the coil 82 of the electromagnet assembly 80 in the retractor 60. The electromagnet assembly 80 moves the actuator lever 70 into engagement with one of the teeth 71 on the clutch disk 72. The engagement of the actuator lever 70 with the ratchet tooth 71 blocks rotation of the clutch disk 72 in the belt withdrawal direction 68.

Upon subsequent or continued withdrawal of belt webbing 56 from the retractor 60, the drum 75, which is connected for rotation with the spool 62, rotates in the belt withdrawal direction 68 relative to the stationary clutch disk 72. The relative rotation between the drum 75 and the clutch disk 72 causes the first end portion 77 of the pilot pawl 76 to engage the pin 74 on the clutch disk 72.

The engagement of the pin 74 with the pilot pawl end portion 77 causes the pilot pawl 76 to pivot from the position shown in FIG. 6 to a position (not shown) in which the second end portion 78 of the pilot pawl engages one of the ratchet teeth 79 on the ring 81. The pilot pawl 76 transmits the force of the rotating drum 75 and spool 62 to the ring 81, causing the ring to rotate about the axis 73.

Rotation of the ring 81 causes the actuator member 83 to rotate and to move the lock pawl (not shown) into engagement with the ratchet wheel (not shown). The engagement of the lock pawl with the ratchet wheel blocks rotation of the spool 62 in the belt withdrawal direction 68. This blocks withdrawal of belt webbing 56 from the retractor 60, thus restraining the vehicle occupant.

The battery 96 in the first seat 16 has an output of about six volts. The capacitor and voltage booster assembly 98 acts to provide approximately 30 volts of power to the retractor coil 82 for about ten milliseconds, and then decays to the normal battery voltage of six volts. The 30 volt pulse applied to the electromagnet assembly 80 moves the actuator lever 70 more rapidly into engagement with the clutch disk 72 than if only the six volt output of the battery 96 were applied.

The retractor lock and timer circuitry 102 keeps the electromagnet assembly 80 energized for about 100 milliseconds. Thus, the actuator lever 70 is held in engagement with the clutch disk 72 for about 100 milliseconds, even if the deceleration sensor switch 24 is actuated for a shorter period of time. After the 100 millisecond period, if the deceleration sensor switch 24 is still closed, the retractor lock and timer circuitry 102 maintains the retractor 60 in the locked condition.

Upon cessation of vehicle deceleration exceeding the predetermined deceleration, the metal ball 28 moves away from the conductive pad 30, thereby de-energizing the RF transmitter 42. The RF transmitter 42 ceases transmission of its RF signal, and the RF receiver switch 100 opens, deactivating the electromagnet assembly 80. The actuator lever 70 disengages from the clutch disk 72, enabling rotation of the spool 62 in the belt withdrawal direction 68.

At the same time as the RF signal from the RF transmitter 42 is being received by the RF receiver switch 100 in the first seat 16, the RF signal is also being received by an RF receiver switch in the control module 114 of the second vehicle seat 18. The second seat control module 114 then actuates the locking mechanism of the second seat retractor 112. The second seat retractor 112 blocks withdrawal of the belt webbing 110 from the second seat retractor, thus restraining movement of the vehicle occupant in the seat 18. Thus, the retractor 112 of the second vehicle seat 18 is locked simultaneously with the locking of the retractor 60 of the first seat 16.

As noted above, the control module 94 in the vehicle seat 16 does not include a deceleration sensor. Therefore, the control module 94 can be mounted in any location and in any orientation in the vehicle seat 16. The control module 94 can, for example, be connected with the retractor 60 in a tiltable vehicle seat back.

Further, all electrical parts of the system 10 which are on or in the seat 16 are powered by the battery 96, which is also in the seat 16. Thus, the seat 16 may be removed entirely from the vehicle without needing to be disconnected from the electrical system of the vehicle 12.

Any suitable number of vehicle occupant safety devices can be simultaneously actuated by the RF signal transmitted from the RF transmitter 42. Thus, if more than two seats are provided in a vehicle, each with its own electrically actuatable seat belt retractor, all of the retractors can simultaneously be actuated by the one single central deceleration sensor and transmitter module 20.

Figure 3:
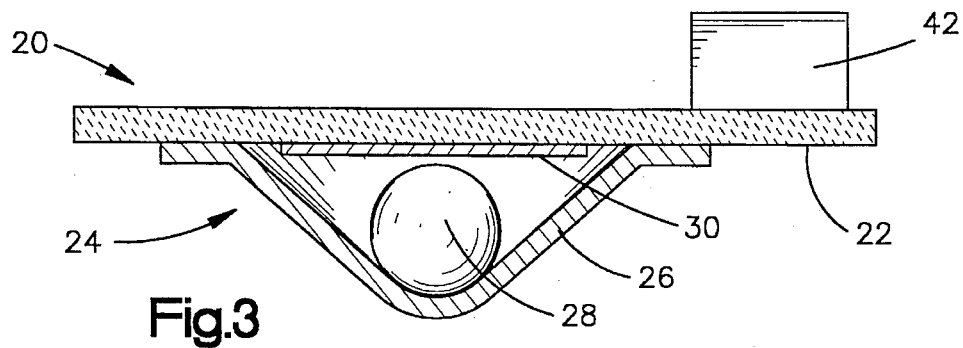
FIG. 3 is a schematic sectional view taken along line 3—3 of FIG. 2.

FIG. 7 illustrates a seat control module 120 which is part of a seat belt retractor system in accordance with a second embodiment of the invention. In the second embodiment, parts which are similar to those of the first embodiment are given the same reference number with the suffix "a" added. The seat belt retractor system including the module 120 does not include a central deceleration sensor and transmitter module 20. Instead, the seat-mounted control module 120 includes, in place of the RF receiver switch 100 (FIG. 5), a deceleration sensor switch 24a which is similar to the deceleration sensor switch 24 (FIG. 3). The control module 120 is otherwise similar to the control module 94. The control module 120 is disposed in a non-tiltable portion of a vehicle seat. The control module 120 is electrically connected with a retractor such as the retractor 60.

In the event of vehicle deceleration exceeding a predetermined deceleration, the deceleration sensor switch 24a in the seat-mounted control module 120 completes an electric circuit including a battery 96a, a capacitor and voltage booster assembly 98a, and retractor lock and timer circuitry 102a. The coil 82 of the electromagnet assembly 80 in the retractor 60 is energized by an electric current transmitted from the control module 120 to block rotation of the retractor spool in the belt withdrawal direction. This restrains movement of the vehicle occupant in the seat which includes the control module 120.

With this second embodiment of the invention, the entire seat belt retractor system, including the deceleration sensor 24a, is completely integrated into the vehicle seat and is independent of the vehicle's electrical system.

Figure 8:
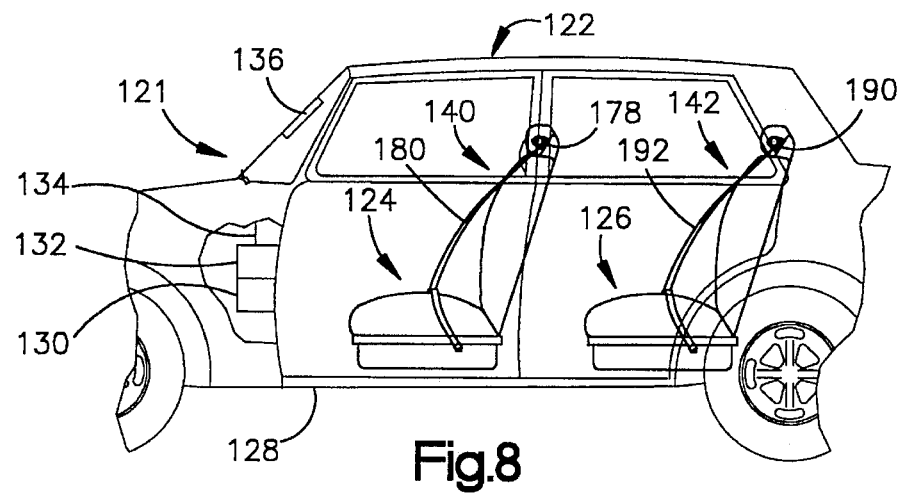
FIG. 8 is a view similar to FIG. 1 including a vehicle safety apparatus in accordance with a third embodiment of the invention.
Figure 9:
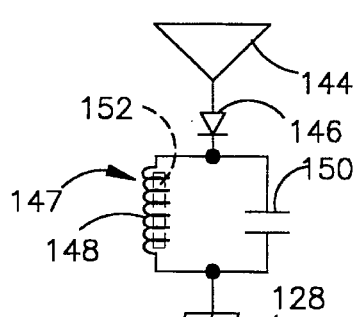
FIG. 9 is a schematic illustration of electric circuitry in the vehicle safety apparatus of FIG. 8.
Figure 10:
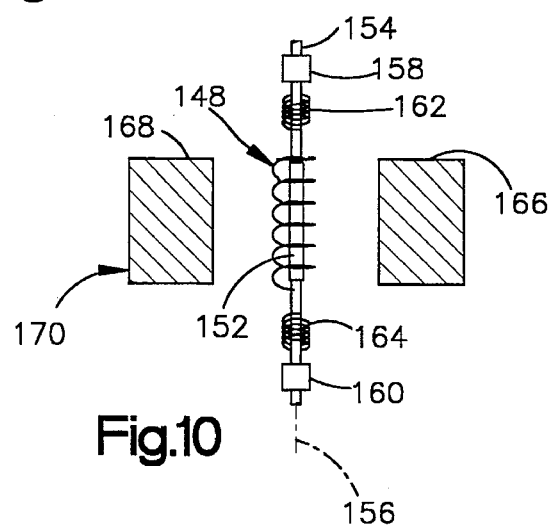
FIG. 10 is a schematic view of a portion of the vehicle safety apparatus of FIG. 8.

FIGS. 8–11 illustrate a vehicle safety apparatus 121 in accordance with a third embodiment of the invention. As shown in FIG. 8, a vehicle 122 includes first and second vehicle seats 124 and 126. The seats 124 and 126 are mounted on a body or other structure 128 of the vehicle 122.

A deceleration sensor 130 is mounted on the vehicle body 128 along with a transmitter 132. The sensor 130 and transmitter 132 may be of the type illustrated in FIG. 2. The output of the transmitter 132 is coupled by suitable electric wiring 134 to a windshield mounted antenna 136. The antenna 136 is operative to transmit the output of the transmitter 132 as an electromagnetic field (EMF) signal within the vehicle 122. The antenna 136 can alternatively be mounted on the interior of the vehicle roof or head liner.

The vehicle seat 124 includes a vehicle occupant restraint 140. The vehicle seat 126 includes a vehicle occupant restraint 142, identical to the vehicle occupant restraint 140. In a preferred embodiment of the invention, the vehicle occupant restraints 140 and 142 are vehicle seat belt systems which include seat belt retractors similar to the retractor 60 illustrated in FIG. 6, but without the electromagnet assembly 80.

The vehicle occupant restraint 140 includes a receiving antenna 144 (FIG. 9) connected through a rectifying diode 146 to an LC tank circuit 147. The LC tank circuit 147 includes an inductor which is a coil 148 and a capacitor 150. The coil 148 and the capacitor 150 are wired in parallel. The inductance capacitance (LC) tank circuit 147 is grounded to the vehicle body 128. The values of the coil 148 and of the capacitor 150 are selected so that the tank circuit 147 resonates when it receives a signal with a predetermined frequency which is equal to the frequency of the EMF signal transmitted by the transmitter 132. A frequency of transmission of 200 MHz is preferably used.

The coil 148 (FIG. 10) is wound on a soft iron core 152. The coil 148 is disposed between the poles 166 and 168 of a fixed permanent magnet 170. The coil 148 is fixed for rotation with a shaft 154 supported for rotational movement about an axis 156 on bearings 158 and 160. Suitable slip rings (not shown) provide the electrical connections to the movable coil 148. Restraining springs 162 and 164 bias the coil 148 and the shaft 154 to a predetermined position of rotation relative to the axis 156.

Figure 11:
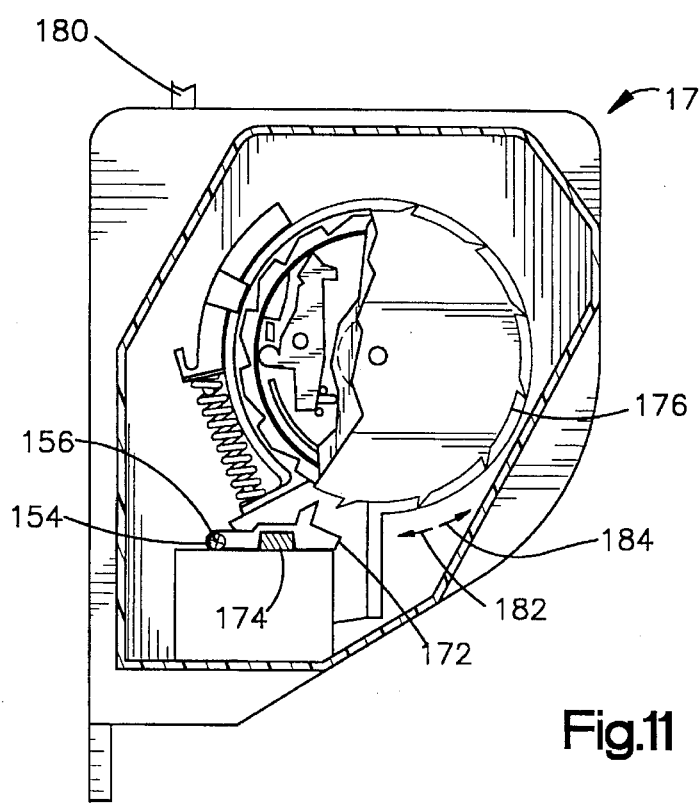
FIG. 11 is a view similar to FIG. 6 of a seat belt retractor forming a part of the vehicle safety apparatus FIG. 8.

The shaft 154 is fixed for movement with an actuator lever 172 of a seat belt retractor 178 (FIG. 11). The actuator lever 172 is movable, upon rotation of the shaft 154, between a first position resting on a stop 174 and a second position in engagement with a clutch disk 176. The retractor 178 includes a spool (not shown) on which belt webbing 180 is wound. The spool is rotatable in a belt withdrawal direction 182 and in an opposite belt retraction direction 184.

In the event of vehicle deceleration exceeding a predetermined deceleration, such as occurs in a vehicle collision, the deceleration sensor 130 energizes the transmitter 132. The transmitter 132, when energized, causes the antenna 136 to transmit an EMF signal within the vehicle.

The EMF signal is received by the antenna 144 (FIG. 9) of the vehicle occupant restraint 140. The EMF signal passes through the rectifying diode 146 to the tank circuit 147. The tank circuit 147 produces an oscillating current due to the tank circuit and a direct current in the coil 148 due to the diode rectification. Because of the orientation of the coil 148 relative to the permanent magnet 170, the flow of direct current within the coil causes the coil to rotate about the axis 156, against the bias of the restraining springs 162 and 164.

As the coil 148 rotates about the axis 156, the shaft 154, which is fixed for rotation with the coil 148, rotates also. Rotation of the shaft 154 effects pivoting movement of the actuator lever 172 into its second position in engagement with the clutch disk 176. The actuator lever 172 blocks rotation of the clutch disk 176 in the belt withdrawal direction 182. As described above, this blocks rotation of the belt spool in the belt withdrawal direction 182 and therefore blocks withdrawal of belt webbing 180 from the retractor 178.

At the same time as the vehicle occupant restraint 140 is actuated by the EMF signal from the transmitter 132, the vehicle occupant restraint 142 is simultaneously actuated by the EMF signal. Actuation of the vehicle occupant restraint 142 occurs in a manner similar to the manner of actuation of the vehicle occupant restraint 140, including locking of a retractor 190 having an associated length of belt webbing 192.

The power to energize the coil 148 and to move the actuator lever 172 is contained in and provided by the transmitted electromagnetic field signal. The electric circuitry shown schematically in FIG. 10 extracts the needed energy from the EMF signal to move the pawl 172. Assuming a static magnetic field of 0.7 Tesla, 100 turns of wire in the coil 148, a coil length of 14 millimeters and radius of 7 millimeters, and a current of 1 milliampere, a torque of 13.72 microjoules is produced to move the actuator lever 172.

The static magnetic field strength of 0.7 Tesla is available in a neodymium-iron combination permanent magnet. The 1 milliampere value is obtained by a transmitting antenna 136 producing a field of 10 volts per meter. At 6 meters, the field strength would be approximately 0.3 volts. This field will produce the 1 milliampere current in the tank circuit 147.

The vehicle safety apparatus 121 eliminates the need for a separate power source to actuate a vehicle occupant restraint mounted on a vehicle seat. No battery is needed in either vehicle seat 124 or 126. Thus, no electrical connections are needed between the vehicle seats 124 and 126 and the electrical circuitry of the vehicle 122. Accordingly, the vehicle safety apparatus 121 may be termed wireless. This allows the seats 124 and 126 to be easily removed from the vehicle 122 without the need for disconnecting wiring harnesses, and no reconnection is necessary when a vehicle seat is replaced.

From the above description of the invention, those skilled in the art will perceive improvements, changes and modifications in the invention. For example, a different type of deceleration sensor switch could be used, such as a non-mechanical sensor. This could allow placement of the non-mechanical deceleration sensor switch in a tiltable vehicle seat back along with a seat back angle sensor to compensate for the seat back inclination. Also, a different type of electrically actuatable retractor locking mechanism could be used.

The system could additionally or alternatively incorporate a type of actuatable vehicle safety device other than a seat belt retractor such as a seat belt pretensioner, an inflatable seat belt, or an air bag. Such improvements, changes and modifications within the skill of the art are intended to be covered by the appended claims.

We claim:

1. A vehicle safety apparatus comprising:

a seat for an occupant of a vehicle;

vehicle occupant protection means on said seat and actuatable for protecting a vehicle occupant in response to vehicle deceleration exceeding a predetermined deceleration;

mounting means for mounting said vehicle occupant protection means on said seat;

sensor means for sensing vehicle deceleration exceeding a predetermined deceleration and for providing a control signal indicative thereof;

transmitter means operatively coupled to said sensor means and actuatable in response to the control signal for transmitting an EMF signal;

signal receiver means for receiving said transmitted EMF signal;

means for mounting said signal receiver means for movement in response to said signal receiver means receiving said transmitted signal; and means for actuating said vehicle occupant protection means in response to movement of said signal receiver means.

2. A vehicle safety apparatus as set forth in claim 1 wherein said signal receiver means comprises a coil and including means for producing an alternating current in said coil.

3. A vehicle safety apparatus as set forth in claim 2 further including a fixed permanent magnet providing a magnetic field, said means for mounting said signal receiver means for movement including means for mounting said coil for rotation in the magnetic field.

4. A vehicle safety apparatus as set forth in claim 3 wherein said means for actuating said vehicle occupant protection means in response to movement of said coil includes shaft means fixed for rotation with said coil and means for transmitting rotary movement of said shaft means to said vehicle occupant protection means to actuate said vehicle occupant protection means.

5. A vehicle safety apparatus as set forth in claim 1 wherein said vehicle occupant protection means comprises a seat belt retractor having a spool on which belt webbing is wound and which is rotatable in a belt withdrawal direction and an opposite belt retraction direction and a locking means for blocking rotation of said spool in the belt withdrawal direction in response to movement of said signal receiver means.

6. A vehicle safety apparatus as set forth in claim 5 wherein said locking means comprises a locking member and an intermediate linkage operatively disposed between said locking member and said retractor spool, said locking member acting through said intermediate linkage to block rotation of said spool in the belt withdrawal direction upon movement of said locking member into a locking position.

7. A vehicle safety apparatus comprising:

sensor means for sensing vehicle deceleration exceeding a predetermined deceleration and for providing a control signal indicative thereof;

transmitter means operatively coupled to said sensor means and actuatable in response to the control signal for transmitting an EMF signal;

receiver means for receiving said transmitted EMF signal;

means for mounting said receiver means for movement in response to said receiver means receiving said transmitted EMF signal; and means for actuating a vehicle occupant protection means in response to movement of said receiver means.

* * * * *